US009525377B2

(12) United States Patent
Wang et al.

(10) Patent No.: US 9,525,377 B2
(45) Date of Patent: Dec. 20, 2016

(54) SYSTEM AND METHOD OF ROTOR TIME CONSTANT ONLINE IDENTIFICATION IN AN AC INDUCTION MACHINE

(71) Applicant: Eaton Corporation, Cleveland, OH (US)

(72) Inventors: Kai Wang, Hang Zhou (CN); Wenxi Yao, Hang Zhou (CN); Huaqiang Li, Menomonee Falls, WI (US); Zhengyu Lu, Hang Zhou (CN)

(73) Assignee: Eaton Corporation, Cleveland, OH (US)

( * ) Notice: Subject to any disclaimer, the term of this patent is extended or adjusted under 35 U.S.C. 154(b) by 39 days.

(21) Appl. No.: 14/703,554

(22) Filed: May 4, 2015

(65) Prior Publication Data
US 2015/0236631 A1 Aug. 20, 2015

Related U.S. Application Data

(63) Continuation of application No. 13/929,914, filed on Jun. 28, 2013, now Pat. No. 9,024,569.

(51) Int. Cl.
*H02P 21/08* (2016.01)
(52) U.S. Cl.
CPC .................................. *H02P 21/08* (2013.01)
(58) Field of Classification Search
CPC ........................................................ H02P 21/08
USPC ................................ 318/799, 798, 767, 727
See application file for complete search history.

(56) References Cited

U.S. PATENT DOCUMENTS

| 4,670,698 | A | 6/1987 | Fulton et al. |
| 5,729,113 | A | 3/1998 | Jansen et al. |
| 5,859,521 | A | 1/1999 | Tajima et al. |
| 6,137,258 | A | 10/2000 | Jansen |
| 6,316,904 | B1 | 11/2001 | Semenov et al. |
| 6,509,711 | B1 | 1/2003 | Zaremba |

(Continued)

FOREIGN PATENT DOCUMENTS

| CN | 1042184 A | 2/1999 |
| EP | 2120329 A2 | 11/2009 |
| WO | 2012129799 A1 | 10/2012 |

OTHER PUBLICATIONS

Attaianese et al., "On Line Estimation of Speed and Parameters in Induction Motor Drives," Proc. IEEE Int. Symp. Ind. Electron., 1997, pp. 1054-1059.

(Continued)

*Primary Examiner* — David S Luo
(74) *Attorney, Agent, or Firm* — Ziolkowski Patent Solutions Group, SC

(57) ABSTRACT

A system and method for determining a rotor time constant of an AC induction machine is disclosed. During operation of the induction motor, a flux signal is injected into a rotor flux command so as to generate a time-variant rotor flux. A voltage-current flux observer determines amplitudes of rotor flux variations resulting from the time-variant rotor flux, with the amplitudes of the rotor flux variations comprising an amplitude of a rotor flux variation based on a current model of the voltage-current flux observer and an amplitude of a rotor flux variation based on a combined voltage-current model of the voltage-current flux observer. A rotor time constant of the induction motor is then estimated based on the determined amplitudes of the rotor flux variations.

20 Claims, 4 Drawing Sheets

(56) References Cited

U.S. PATENT DOCUMENTS

| | | | |
|---|---|---|---|
| 6,661,194 B2 | 12/2003 | Zaremba et al. | |
| 6,683,428 B2 | 1/2004 | Pavlov et al. | |
| 7,034,497 B2 | 4/2006 | Markunas et al. | |
| 7,659,685 B2* | 2/2010 | Cesario .................. | G05B 13/04 318/568.13 |
| 7,671,558 B2 | 3/2010 | Yamamoto et al. | |
| 8,102,140 B2 | 1/2012 | Gao et al. | |
| 8,115,441 B2 | 2/2012 | Romenesko et al. | |
| 8,203,293 B2 | 6/2012 | Ohgushi | |
| 8,384,338 B2 | 2/2013 | Lu et al. | |
| 2009/0021208 A1 | 1/2009 | Romenesko et al. | |
| 2009/0284211 A1 | 11/2009 | Gao et al. | |
| 2012/0038298 A1 | 2/2012 | Villwock et al. | |
| 2012/0038299 A1 | 2/2012 | Villwock et al. | |
| 2012/0038303 A1 | 2/2012 | Villwock et al. | |
| 2012/0038311 A1 | 2/2012 | Villwock et al. | |

OTHER PUBLICATIONS

Kubota et al., "Speed Sensorless Field-Oriented Control of Induction Motor with Rotor Resistance Adaptation," IEEE Transactions on Industry Applications, vol. 30, No. 5, Sep./Oct. 1994, pp. 1219-1224.

Pana, "Sensorless Vector-Controlled Induction Motor Drive System with Rotor Resistance Estimation Using Parallel Processing with Floating Point Dsp," Proc. Power Electron. Motion Contr. Cont., 1996, pp. 948-953.

Akatsu et al., "Sensorless Very Low-Speed and Zero-Speed Estimations with Online Rotor Resistance Estimation of Induction Motor Without Signal Injection," IEEE Transactions on Industry Applications, vol. 36, No. 3, May/Jun. 2000, pp. 764-771.

Akatsu et al., "Online Rotor Resistance Estimation Using the Transient State Under the Speed Sensorless Control of Induction Motor," IEEE Transactions on Power Electronics, vol. 15, No. 3, May 2000, pp. 553-560.

Kanmachi et al., "Sensor-less Speed Control of An Induction Motor with No Influence of Secondary Resistance Variation," in Conf. Rec. 1993 IEEE-IAS Annual Meeting, pp. 408-413.

Velez-Reyes et al., "Recursive Speed and Parameter Estimation for Induction Machines," IEEE-IAS Annual Meeting, 1989, pp. 607-611.

Karanayil et al., "Online Stator and Rotor Resistance Estimation Scheme Using Artificial Neural Networks for Vector Controlled Speed Sensorless Induction Motor Drive," IEEE Transactions on Industrial Electronics, vol. 54, No. 1, Feb. 2007, pp. 167-176.

Campbell et al., "Practical sensorless induction motor drive employing an artificial neural network for online parameter adaptation," IEE Proc.-Electr. Power Appl., vol. 149, No. 4, Jul. 2002, pp. 255-260.

Ha et al., "An Online Identification Method for Both Stator and Rotor Resistances of Induction Motors Without Rotational Transducers," IEEE Transactions on Industrial Electronics, vol. 47, No. 4, Aug. 2000, pp. 842-853.

Toliyat et al., "A Review of RFO Induction Motor Parameter Estimation Techniques," IEEE Transaction son Energy Conversion, vol. 18, No. 2, Jun. 2003, pp. 271-283.

Ambrozic et al., "Induction Machine Sensorless Control with Stator and Rotor Resistance Adaptation," Proc. IEEE Appl. Power Electronc. Conf., 1999, pp. 1237-1243.

Lascu et al., "A Modified Direct Torque Control for Induction Motor Sensorless Drive," IEEE Transactions on Industry Applications, vol. 36, No. 1, Jan./Feb. 2000, pp. 122-130.

Jansen et al., "Observer-Based Direct Field Orientation for both Zero and Very High Speed Operation," Proc. 1993 IEEE PCC Yokohama Tech. Conf., 1993, pp. 432-437.

Marcetic et al., "Speed-Sensorless AC Drives With the Rotor Time Constant Parameter Update," IEEE Transactions on Industrial Electronics, vol. 54, No. 5, Oct. 2007, pp. 2618-2625.

Wu et al., "Induction-Motor Stator and Rotor Winding Temperature Estimation Using Signal Injection Method," IEEE Transactions on Industry Applications, vol. 42, No. 4, Jul./Aug. 2006, pp. 1038-1044.

Blasco-Gimenez et al., "Dynamic performance limitations for MRAS based sensorless induction motor drives. Part 2: Online parameter tuning and dynamic performance studies," IEE Proc.-Electr. Power Appl., vol. 143, No. 2, Mar. 1996, pp. 123-134.

Kim et al., "Vector Control System for Induction Motor Without Speed Sensor at Very Low Speed," IEEE, 1995, pp. 524-529.

Toliyat et al., "Rotor Time Constant Updating Scheme for a Rotor Flux-Oriented Induction Motor Drive," IEEE Transactions on Power Electronics, vol. 14, No. 5, Sep. 1999, pp. 850-857.

Dittrich, "Parameter sensitivity of procedures for on-line adaptation of the rotor time constant of induction machines with field oriented control," IEE Proc.-Electr. Power Appl., vol. 141, No. 6, Nov. 1994, pp. 353-359.

Telford et al., "Online Identification of Induction Machine Electrical Parameters for Vector Control Loop Tuning," IEEE Transactions on Industrial Electronics, vol. 50, No. 2, Apr. 2003, pp. 253-261.

Hasegawa et al., "Experimental Evaluation on Parameter Identification of Induction Motor Using Output Inter-Sampling Approach," IEEE, 2005, pp. 1283-1288.

Soltani et al., "A Current-Based Output Feedback Sliding Mode Control for Speed Sensorless Induction Machine Drive Using Adaptive Sliding Mode Flux Observer," IEEE, 2003, pp. 226-231.

Hurst et al., "A Self-Tuning Closed-Loop Flux Observer for Sensorless Torque Control of Standard Induction Machines," IEEE Transactions on Power Electronics, vol. 12, No. 5, Sep. 1997, pp. 807-815.

\* cited by examiner

SYSTEM AND METHOD OF ROTOR TIME CONSTANT ONLINE IDENTIFICATION IN AN AC INDUCTION MACHINE

CROSS-REFERENCE TO RELATED APPLICATION

The present invention is a continuation of and claims the benefit of U.S. Ser. No. 13/929,914, filed on Jun. 28, 2013, the disclosure of which is incorporated herein by reference in its entirety.

BACKGROUND OF THE INVENTION

The present invention relates generally to AC induction machines and, more particularly, to a system and method for determining a rotor time constant of an AC induction machine.

Electric motors, such as AC induction motors, consume a large percentage of generated electricity capacity. Many applications for this "workhorse" of industry are fan and pump industrial applications. For example, in a typical integrated paper mill, low voltage and medium voltage motors may comprise nearly 70% of all driven electrical loads. Due to the prevalence of these motors in industry, it is paramount that the electric motors be operated reliably and efficiently. Motor design parameters and performance parameters are often required by motor management systems to optimize the control and operations of electric motors. Similarly, motor status monitoring enables the electric motors to operate reliably, and many motor status monitoring techniques look for certain motor design parameters and performance parameters to optimize performance of the motor.

One such motor performance parameter that is helpful in optimizing the control and operations of induction motors is the rotor time constant (rotor resistance), which has a great influence on the dynamic regulation performance and the steady-state error of speed estimation (in a speed sensorless induction machine control). That is, an accurate knowledge of the rotor time constant is essential for both decoupling control and speed estimation. However, it is difficult to identify the rotor time constant, especially when a speed sensor is not available/integrated into the induction motor and/or motor control system. That is, it is recognized that, when the induction motor is working in steady state, simultaneous estimation of speed and rotor time constant (rotor resistance) is not theoretically possible and that, only when the flux magnitude varies with time periodically, can the simultaneous estimation of speed and rotor time constant be achieved.

Various prior art techniques have been employed to estimate the rotor time constant. One such prior art technique utilizes the rotor flux variation during the transient process and a least square strategy to complete the rotor resistance online updating at all speeds. However, such a transient process rarely appears in some industrial applications, and the least square strategy greatly increases the computational burden, making the program more complex. Another known prior art technique utilizes the transient process to identify rotor resistance during a high speed and to compensate the rotor resistance in proportion to the variation of stator resistance during a low speed. This method is also restrained in some applications—for lack of a transient process during motor operation and based on the fact that the thermal drift of stator resistance may be not the same as that of rotor resistance, thus there may be some error to compensate the rotor resistance during low speed.

Another known method for estimating the rotor time constant extracts the voltage and current dynamic high-frequency small signals caused by pulse width modulation (PWM) of the inverter to identify rotor time constant. However, the limitations of this method are that a precision sensor is required to detect small signals, the frequency of which are extremely high, and that a faster AD converter is needed to capture the high frequency information. Additionally, variations of this method use either integral operations or high order differential operations, both of which can further lead to more errors.

Still another known method for estimating the rotor time constant extracts the needed information from the ever-present signal jitter of MRAS error. However, the ever-present small signal of the system is extremely hard to capture. Still another known method for estimating the rotor time constant utilizes an online identification algorithm of rotor time constant based on neural network and fuzzy control. However, such a method needs high amounts of computations and the program is rather complex.

Finally, other known methods for estimating the rotor time constant propose an online updating method based on signal injection. One such method identifies the rotor resistance based on the full-order flux observer and an iterative method is used—leading to a complex computation that has a poor accuracy. Another similar method again identifies the rotor resistance based on the full-order flux observer, but requires two small signals of different frequencies, which increases the difficulties of implementation and can be influenced by speed changes. Another such signal injection method is based on an improved least squares method (fixed trace method), which needs high amounts of computations. Still another such signal injection method operates without differential operations of the small signal, but the identification expression is too complex and needs high amounts of computations. In this method, the injected signal frequency must also be chosen carefully, a reasonable band-pass filter must be designed, and a division by zero is inevitable in identifying the rotor time constant, which greatly degrades the accuracy.

It would therefore be desirable to design a system and method that provides for the simultaneous estimation of the rotor speed and rotor time constant. It would further be desirable for such a system and method to provide such estimations with high accuracy under both no-load or full-load conditions, with such estimations being performed using only amplitudes of the measured signals without considering phase drift (so as to avoid a division by zero at zero-crossing points) and by implementing an algorithm that is less computationally burdensome while still providing accurate estimation results.

BRIEF DESCRIPTION OF THE INVENTION

Embodiments of the present invention provide a system and method for determining a rotor time constant of an AC induction machine.

In accordance with one aspect of the invention, a non-transitory computer readable storage medium has stored thereon a computer program comprising instructions which, when executed by at least one processor, cause the at least one processor to generate a rotor flux command for operation of an induction machine, cause a flux signal to be injected into the rotor flux command so as to generate a time-variant rotor flux, and determine by way of a voltage-current flux observer amplitudes of rotor flux variations resulting from the time-variant rotor flux, the amplitudes of the rotor flux variations comprising an amplitude of a rotor flux variation based on a current model of the voltage-current flux observer and an amplitude of a rotor flux variation based on a combined voltage-current model of the voltage-current flux observer. The instructions further cause the at least one processor to estimate a rotor time constant of the induction motor based on the determined amplitudes of the rotor flux variations.

In accordance with another aspect of the invention, a method of determining an online rotor time constant of an AC induction machine includes injecting a flux signal having a pre-determined amplitude and frequency into a rotor flux command so as to generate a time-variant rotor flux, the rotor flux command being provided as part of a vector control scheme implemented by a variable speed drive (VSD) for operation of an induction machine. The method also includes sampling a DC voltage on a DC bus of the VSD and AC line currents on at least two phases output by the VSD, inputting the sampled DC voltage and AC line currents to a closed-loop voltage-current flux observer, determining rotor flux variation amplitudes using the voltage-current flux observer and based at least in part on the sampled DC voltage and AC line currents, and estimating an online rotor time constant of the induction motor based on the determined rotor flux variation amplitudes.

In accordance with yet another aspect of the invention, a motor control system includes a variable frequency drive (VFD) coupleable to an AC induction machine to control operation thereof and at least one processor operably coupled to or integrated with the VFD, the at least one processor being programmed to generate a rotor flux command for operation of an induction machine, cause a flux signal to be injected into the rotor flux command so as to generate a time-variant rotor flux, and provide the time-variant rotor flux command as an input for a vector control of the induction machine, the sensorless vector control being implemented by a variable speed drive to control power input to the induction machine. The at least one processor is further programmed to sample a DC voltage and line currents of the VSD during operation of the induction machine, provide the sampled DC voltage and line currents to a voltage-current flux observer comprising a voltage model and a current model, and determine, by way of the voltage-current flux observer, an amplitude of a rotor flux variation based on the current model and an amplitude of a rotor flux variation based on both the voltage and current models. The at least one processor is still further programmed to estimate a rotor time constant of the induction motor based on the amplitudes of the determined rotor flux variations and estimate a rotor speed of the induction motor based on the rotor time constant, wherein the rotor time constant of the induction motor is estimated without consideration of a phase drift of the rotor flux variations, such that no division by zero at zero-crossing points is performed in estimating the rotor time constant.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Embodiments of the invention are directed to a system and method that provides for the simultaneous estimation of the rotor speed and rotor time constant in an AC induction machine. According to embodiments of the invention, the estimation of the rotor speed and rotor time constant for the AC induction machine may be performed by any of a number of digital signal processing (DSP) devices, with such devices being either integrated into a motor drive associated with the induction machine or being provided as stand-alone algorithm unit and/or processing/computing device.

Figure 1:
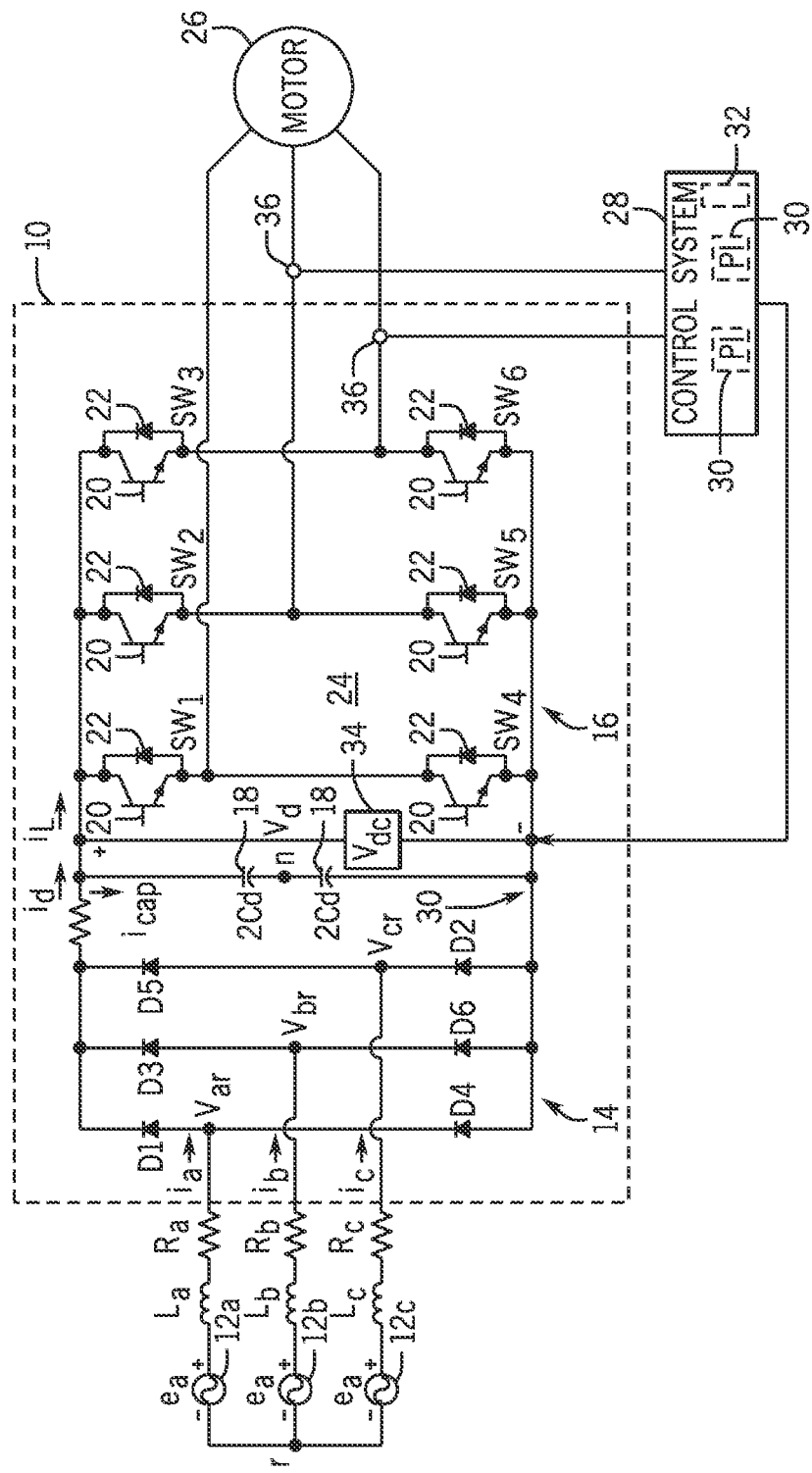
FIG. 1 is schematic of an AC motor drive and associated induction motor for use with embodiments of the invention.

Referring to FIG. 1, the general structure of a motor drive 10 configured to control operation of an associated AC induction machine is shown that is useable with embodiments of the invention.

The motor drive 10 may be configured, for example, as a variable speed drive (VSD) designed to receive a three AC power input, rectify the AC input, and perform a DC/AC conversion of the rectified segment into a three-phase alternating voltage of variable frequency and amplitude that is supplied to a load. In a preferred embodiment, the VSD operates according to an exemplary volts-per-hertz characteristic. In this regard, the motor drive provides voltage regulation of ±1% in steady state with less than 3% total harmonic distortion, ±0.1 Hz in output frequency, and fast dynamic step load response over a full load range. Also in a preferred embodiment, the VSD provides control according to a vector or field-oriented control scheme.

In an exemplary embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form a PWM inverter 24. The PWM inverter 24 synthesizes AC voltage waveforms with a fixed frequency and amplitude for delivery to a load, such as an induction motor 26. Operation of the inverter 24 is via a control system 28, which may further be comprised of a plurality of proportional integral (PI) controllers 30 and other associated processors 32 that perform high speed operations such as space-vector modulation, DC bus voltage decoupling, and protection, for example. The control system 28 interfaces to the PWM inverter 24 via gate drive signals and sensing of the DC bus voltage and pole currents (by way of a voltage sensor 34 and current sensors 36, for example). Changes in the DC bus voltage can be sensed and interpreted as transient load conditions and are used to control switching of the switch array 16 of PWM inverter 24 such that near steady-state load conditions are maintained.

Figure 2:
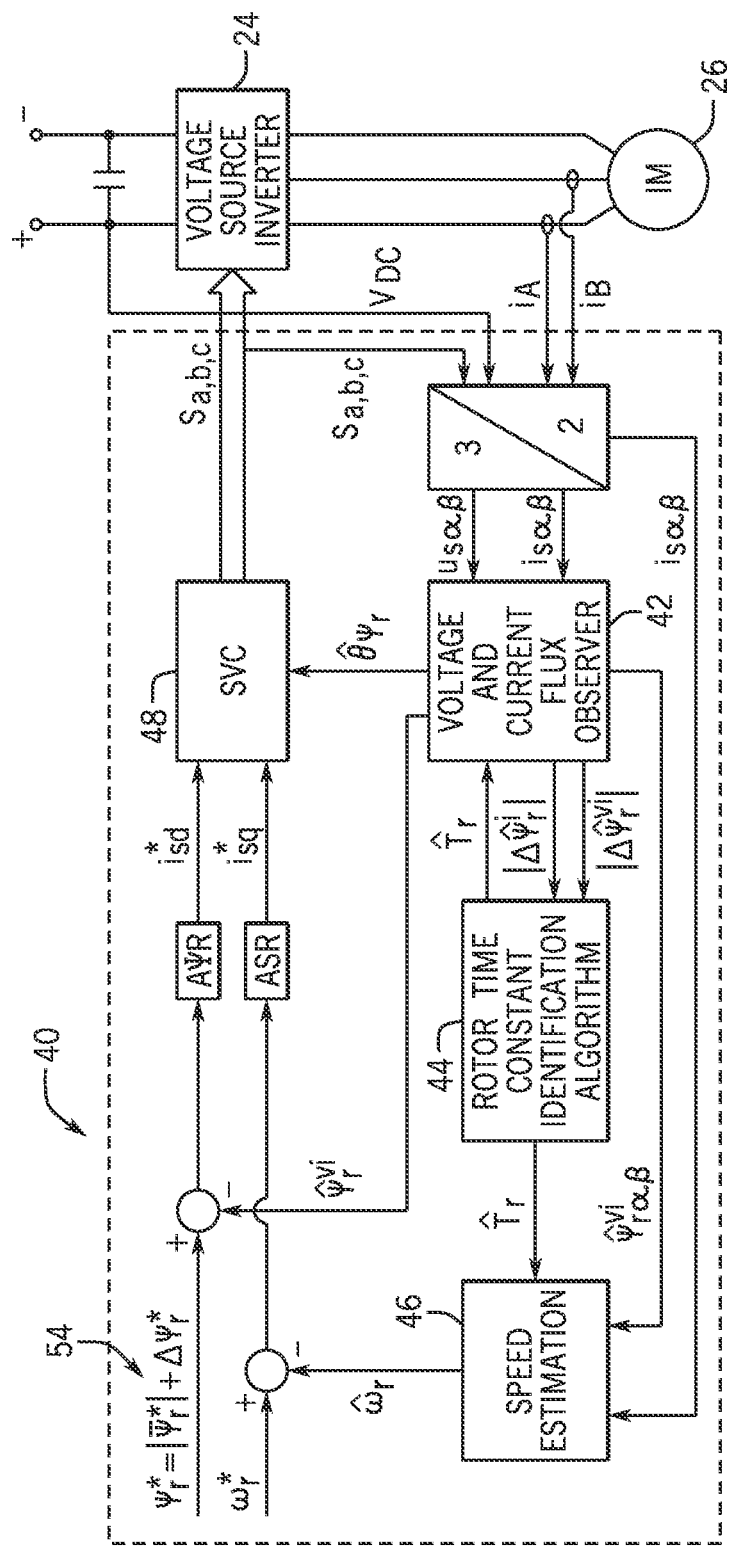
FIG. 2 is a schematic block diagram of a control scheme that provides for simultaneous estimation of the rotor speed and rotor time constant of an induction machine according to an embodiment of the invention.

Referring now to FIG. 2, a block diagram of a speed control scheme 40 for an induction machine, such as induction machine 26 in FIG. 1, is shown according to an embodiment of the invention. According to embodiments of the invention, the speed control scheme 40 may be implemented as an algorithm or DSP code stored on a processing/computing device on control system 28 (e.g., PI controllers 30/processor 32 —FIG. 1) of motor drive 10 or on a separate processing/computing device operably coupled to the motor drive 10, for example.

The speed control scheme 40 provides for simultaneous estimation of the rotor speed $\omega_r$ and the rotor time constant $T_r$ of the induction machine 26. The speed control scheme 40 includes four major components—identified as control blocks in FIG. 2—with the components including a closed-loop of voltage and current flux observer 42, a rotor time constant identification algorithm 44, a speed estimator 46, and a rotor flux oriented auto-tuning decoupling controller 48 that provides sensorless vector control (SVC) of the induction machine (i.e., field-oriented control or variable speed drive (VSD) control of the induction machine), a vector control motor drive configured to control operation of the induction machine, the vector control motor drive having a DC bus therein and configured to invert a DC voltage on the DC bus to a three-phase AC output;

In implementing the speed control scheme 40 for induction motor 26, only the DC bus voltage and line currents need to be sampled (such as via the voltage sensor 34 and current sensors 36 of FIG. 1). As no speed sensor is employed to determine the rotor speed $\omega_r$, a model reference adaptive system (MRAS) speed estimator is employed. The voltage and current flux observer 42 provides a stationary axis based rotor flux $\hat{\psi}_{r\alpha\beta}^{vi}$ as reference of the MRAS model, while the adjusted model of MRAS is the pure current flux observer which provides an adjustable stationary axis based rotor flux $\hat{\psi}_{r\alpha\beta}^{adj}$. The adaptive law applied by the MRAS model is $e=\psi_{r\alpha}^{vi}\cdot\hat{\psi}_{r\beta}^{adj}-\psi_{r\beta}^{vi}\cdot\hat{\psi}_{r\alpha}^{adj}$, and the speed is adjusted by a proportional-integral (PI) regulator (e.g. PI regulator/controller 30 of FIG. 1) integrated with the voltage and current flux observer 42.

Figure 3:
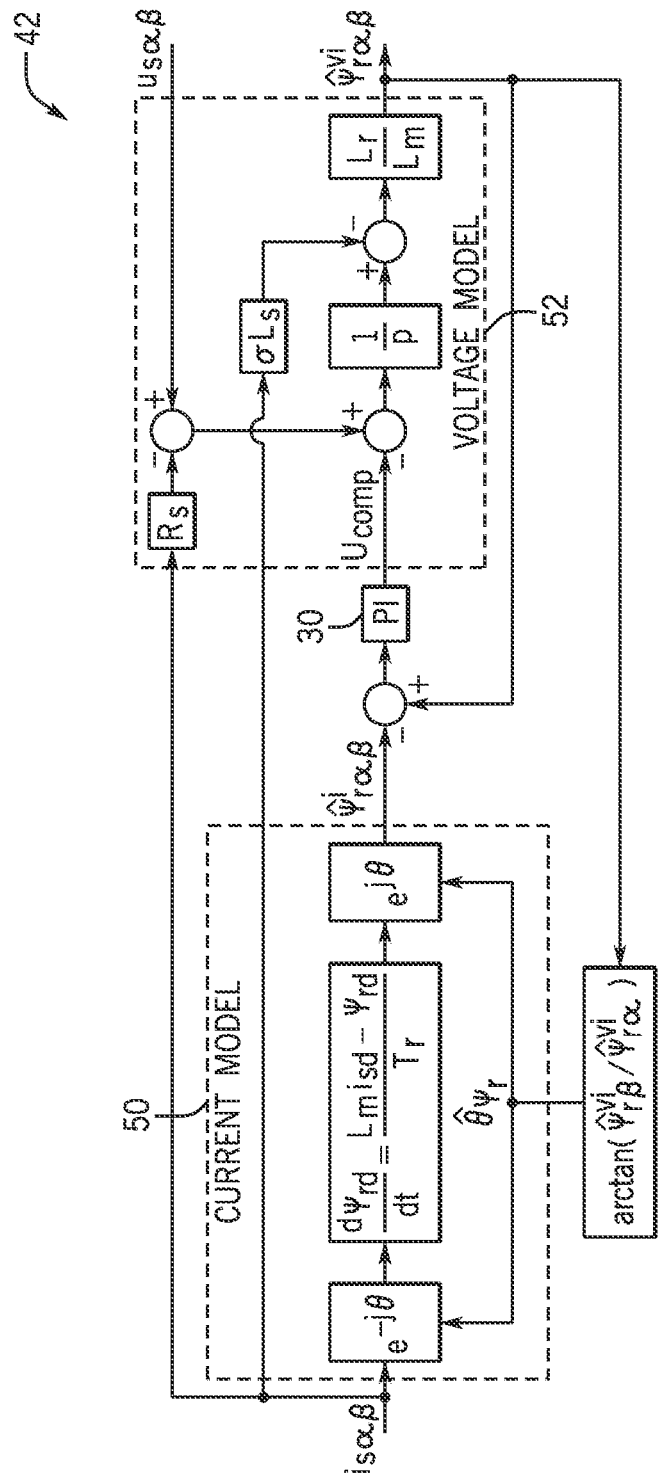
FIG. 3 is a schematic of a closed-loop voltage and current flux observer for use with the control scheme of FIG. 2 according to an embodiment of the invention.

Referring now to FIG. 3, a closed-loop voltage and current flux observer 42 that combines the voltage and current model through a PI controller 30 is shown according to an embodiment of the invention. As shown in FIG. 3, a current model 50 and voltage model 52 form part of the closed-loop voltage and current flux observer 42, into which the measured DC bus voltage and line currents are input.

Regarding the closed-loop voltage and current flux observer 42 shown in FIG. 3, the transfer function of the flux observer can be expressed as:

$$\hat{\psi}_{r\alpha\beta}^{vi} = \frac{\frac{L_m}{L_r}s}{\frac{L_m}{L_r}s+G(s)}\psi_{r\alpha\beta}^{v} + \frac{G(s)}{\frac{L_m}{L_r}s+G(s)}\hat{\psi}_{r\alpha\beta}^{i}, \quad \text{[Eqn. 1]}$$

$\psi_{r\alpha\beta}^{v}=\psi_{r\alpha}^{v}+j\psi_{r\beta}^{v}$ refers to the rotor flux estimated by an open-loop voltage flux observer based on the stationary α-β axis, $\psi_{r\alpha\beta}^{i}=(\psi_{rd}^{i}+j\psi_{rq}^{i})\cdot e^{j\theta}$ and refers to the rotor flux estimated by open-loop current flux observer based on the synchronous rotating d-q axis, $L_m$ is the magnetizing inductance, $L_r$ is the rotor inductance, and G(s) is a PI regulator: $G(s)=K_p(1+K_i/s)$, where $s=j\omega_e$. The optional choice of the closed-loop flux observer bandwidth is to determine the best frequency range of the transition from voltage model to current model. In general, $K_p$ is essential and $K_i$ has little effect, so $K_i$ is chosen as 0 for simplification.

According to embodiments of the invention, the speed control scheme 40, and the closed-loop voltage and current flux observer 42 thereof, are utilized to simultaneously estimate the rotor speed and rotor time constant of induction machine 26. In performing such an estimation, the speed control scheme 40 causes a small flux signal of constant frequency to be injected on the flux command (supplied by motor drive 10, for example) to identify the rotor time constant. Only amplitudes of the resulting small signal rotor flux variations need to be calculated without considering the phase drift of the flux variations, which avoids a division by zero at zero-crossing points. In estimating the rotor speed and rotor time constant, it is recognized that the stator and rotor inductances ($L_s$, $L_r$), as well as the magnetizing inductances ($L_m$) are rarely changed under the rated running speed and can be updated online according to the magnetizing curve in the flux weakening region. Therefore, in estimating the rotor speed and rotor time constant, the stator, rotor and magnetizing inductances are assumed to be known previously and have constant values during the identification.

Referring back to FIG. 2, and as shown therein, the rotor flux command is added by a small signal having a desired/pre-determined amplitude and frequency—identified at 54 in FIG. 2—that is denoted by:

$$\Delta\psi_r^* = A^* \sin(\omega^* t + \phi^*) \quad \text{[Eqn. 2a]},$$

where $A^*$ is the amplitude of the injected signal (generally less than 5% of a value of the flux command $\psi_r^*$) and $\omega^*$ is the frequency of the injected signal—the frequency being kept constant and being chosen regardless of the synchronized rotation frequency of the induction machine. Injection of the small flux signal to the flux command at the injected signal frequency thereby generates a time-variant rotor flux command.

Due to small signal injection, the real flux and the estimated flux can be expressed as a large DC signal added by a small signal, that is:

$$\psi_{rd}=|\bar{\psi}_{rd}|+\Delta\psi_{rd}, \psi_{rq}=|\bar{\psi}_{rq}|+\Delta\psi_{rq}$$

$$\hat{\psi}_{rd}=|\hat{\bar{\psi}}_{rd}|+\Delta\hat{\psi}_{rd}, \hat{\psi}_{rq}=|\hat{\bar{\psi}}_{rq}|+\Delta\hat{\psi}_{rq} \quad \text{[Eqn. 2b]}.$$

Establishing the dynamic small signal models of the real flux and the estimated flux based on the open-loop of current flux observer, and discarding the higher order infinitesimal, yields:

$$\frac{d\Delta\psi_{rd}}{dt} = -\frac{1}{T_r}\Delta\psi_{rd} + |\bar{\omega}_s|\Delta\psi_{rq} + |\bar{\psi}_{rq}|\Delta\omega_s + \frac{L_m}{T_r}\Delta i_{sd} \quad \text{[Eqn. 3a]}$$

$$\frac{d\Delta\hat{\psi}_{rd}}{dt} = -\frac{1}{\hat{T}_r}\Delta\hat{\psi}_{rd} + |\bar{\omega}_s|\Delta\hat{\psi}_{rq} + |\hat{\bar{\psi}}_{rq}|\Delta\omega_s + \frac{L_m}{\hat{T}_r}\Delta\hat{i}_{sd}. \quad \text{[Eqn. 3b]}$$

Because of the rotor flux orientation, $|\bar{\psi}_{rq}|=\Delta\psi_{rq}=0$, [Eqn. 3a] can be simplified as [Eqn. 4a]:

$$\frac{d\Delta\psi_{rd}}{dt} = -\frac{1}{T_r}\Delta\psi_{rd} + \frac{L_m}{T_r}\Delta i_{sd}. \quad \text{[Eqn. 4a]}$$

Considering that the injected signal has a sine function with a frequency of $\omega^*$, it can be assumed that the small signals of $\Delta\psi_{rd}$, $\Delta\hat{\psi}_{rd}$, $\Delta i_{sd}$, and $\Delta\hat{i}_{sd}$ have a sine function with the frequency of $\omega^*$, respectively. Thus, it can be assumed that:

$$\Delta\psi_{rd} = A \sin(\omega^* t + \phi_1) \quad \text{[Eqn. 5a]}$$

$$\Delta\hat{\psi}_{rd} = \hat{A} \sin(\omega^* t + \hat{\phi}_1) \quad \text{[Eqn. 5b]}$$

$$\Delta i_{sd} = B \sin(\omega^* t + \phi_2) \quad \text{[Eqn. 5c]}$$

$$\Delta\hat{i}_{sd} = \hat{B} \sin(\omega^* t + \hat{\phi}_2) \quad \text{[Eqn. 5d]}.$$

Substituting [Eqn. 5a], [Eqn. 5c] into [Eqn. 4a] yields:

$$\sqrt{1+(\omega^* T_r)^2} \cdot A \sin(\omega^* t + \phi_1 + \gamma) = L_m \cdot B \sin(\omega^* t + \phi_2) \quad \text{[Eqn. 6a]}.$$

Similarly, substituting [Eqn. 5b], [Eqn. 5d] and [Eqn. 5e] into [Eqn. 3b] yields:

$$\sqrt{1+(\omega^* \hat{T}_r)^2} \cdot \hat{A} \sin(\omega^* t + \hat{\phi}_1 + \hat{\gamma}) = L_m \cdot \hat{B} \sin(\omega^* t + \hat{\phi}_2) + \hat{T}_r \cdot (|\overline{\omega}_s| \Delta\hat{\psi}_{rq} + |\overline{\hat{\psi}}_{rq}| \Delta\omega_s) \quad \text{[Eqn. 6b]}.$$

On the other hand, the magnitude and phase error of the flux observer is insensitive to rotor resistance (rotor time constant) in both low speed and high speed under either full-load or no-load. In other words, the rotor flux orientation angle $\theta_{\psi_r}$ is insensitive to the rotor time constant (rotor resistance). That is to say, even if the rotor time constant has an error, the estimated orientation angle $\theta_{\psi_r}$ is quite accurate, thus: $\hat{\psi}_{rq} \approx 0$, then $|\overline{\omega}_s| \Delta\hat{\psi}_{rq} + |\overline{\hat{\psi}}_{rq}| \Delta\omega_s \approx 0$. The d-axis component amplitude of the actual current and the d-axis component amplitude of the estimated current are approximately equal, that is $B \approx \hat{B}$. Therefore, it can be derived from [Eqn. 6a] and [Eqn. 6b] that:

$$\sqrt{1+(\omega^* T_r)^2} \cdot A = L_m \cdot B \approx L_m \cdot \hat{B} = \sqrt{1+(\omega^* \hat{T}_r)^2} \cdot \hat{A} \quad \text{[Eqn. 7]}.$$

Finally, the true value of rotor time constant can be derived as:

$$T_r = \frac{1}{\omega^*} \sqrt{\left[1+(\omega^* \cdot \hat{T}_r)^2\right] \cdot \left(\frac{\hat{A}}{A}\right)^2 - 1} \quad \text{[Eqn. 8]}.$$

The open-loop voltage flux observer has nothing to do with rotor time constant, therefore, the direct calculation of $|\Delta\psi_r^v|$ based on the open-loop voltage flux observer is the real flux small signal amplitude $A$, that is: $A = |\Delta\psi_r^v|$, in which $\Delta\psi_r^v = \psi_r^v - |\overline{\psi}_r^v|$, and:

$$\psi_r^v = \sqrt{\psi_{r\alpha}^{v^2} + \psi_{r\beta}^{v^2}}, \quad |\overline{\psi}_r^v| = \sqrt{|\overline{\psi}_{r\alpha}^v|^2 + |\overline{\psi}_{r\beta}^v|^2} \quad \text{[Eqn. 9a]}.$$

The direct output of the open-loop current flux observer is the estimated flux small signal amplitude $|\Delta\hat{\psi}_r^i|$, that is $\hat{A}$, and $\Delta\hat{\psi}_r^i = \hat{\psi}_r^i - |\overline{\hat{\psi}}_r^i|$, in which:

$$\hat{\psi}_r^i = \sqrt{\hat{\psi}_{r\alpha}^{i^2} + \hat{\psi}_{r\beta}^{i^2}}, \quad |\overline{\hat{\psi}}_r^i| = \sqrt{|\overline{\hat{\psi}}_{r\alpha}^i|^2 + |\overline{\hat{\psi}}_{r\beta}^i|^2} \quad \text{[Eqn. 9b]}.$$

However, the real flux small signal amplitude $|\Delta\psi_r^v|$ cannot be obtained directly by the closed-loop of voltage and current flux observer 42. Taking into account the transfer function of the closed-loop flux observer, one can derive [Eqn. 10] from [Eqn. 1] according to:

$$\hat{\psi}_{r\alpha}^{vi} + j\hat{\psi}_{r\beta}^{vi} = \quad \text{[Eqn. 10]}$$

-continued $$\frac{\frac{L_m}{L_r} s}{\frac{L_m}{L_r} s + G(s)} (\psi_{r\alpha}^v + j\psi_{r\beta}^v) + \frac{G(s)}{\frac{L_m}{L_r} s + G(s)} (\hat{\psi}_{r\alpha}^i + j\hat{\psi}_{r\beta}^i),$$

where $s = j\omega_e$, $L_m \approx L_r$, and $G(s) = K_p$.

Solving the small signal of $\Delta\hat{\psi}_r^{vi}$ by eliminating the large signal of [Eqn. 10] and discarding the higher order infinitesimal provides:

$$|\Delta\hat{\psi}_r^{vi}| = \frac{K_P^2 \cdot |\Delta\hat{\psi}_r^i| + \omega_e^2 \cdot |\Delta\psi_r^v|}{K_P^2 + \omega_e^2}. \quad \text{[Eqn. 11]}$$

Because $A = |\Delta\psi_r^v|$, and $$\hat{A} = |\Delta\hat{\psi}_r^i|,$$

$$\frac{A}{\hat{A}}$$

can be derived from [Eqn. 11] according to:

$$\frac{A}{\hat{A}} = \frac{|\Delta\hat{\psi}_r^{vi}|}{|\Delta\hat{\psi}_r^i|} + \left(\frac{|\Delta\hat{\psi}_r^{vi}|}{|\Delta\hat{\psi}_r^i|} - 1\right) \cdot \frac{K_P^2}{\omega_e^2}. \quad \text{[Eqn. 12]}$$

According to [Eqn. 12], even though $A$ cannot be directly estimated, we can get the proportion of the real and estimated flux small signal $$\frac{A}{\hat{A}},$$

which is needed in [Eqn. 8]. In the high speed region above the demarcation point determined by $K_p$, $K_p \ll \omega_e$, thus $$\frac{K_P}{\omega_e} \approx 0,$$

and [Eqn. 12] is simplified as:

$$\frac{A}{\hat{A}} = \frac{|\Delta\hat{\psi}_r^{vi}|}{|\Delta\hat{\psi}_r^i|}. \quad \text{[Eqn. 13]}$$

It should be pointed that in the low speed region, $$\frac{K_P}{\omega_e} \neq 0.$$

In this situation, for one thing, according to [Eqn. 8], if $$\frac{A}{\hat{A}} > 1,$$

the calculated $T_r$ will be smaller than the offline value $\hat{T}_r$, that is $$\frac{\hat{T}_r}{T_r} > 1,$$

then if $$\frac{A}{\hat{A}} < 1, \frac{\hat{T}_r}{T_r} < 1,$$

and if $$\frac{A}{\hat{A}} = 1, \frac{\hat{T}_r}{T_r} = 1.$$

For another, according to [Eqn. 12], if $$\frac{A}{\hat{A}} > 1, \frac{|\Delta\hat{\psi}_r^{vi}|}{|\Delta\hat{\psi}_r^{i}|} > 1,$$

then if $$\frac{A}{\hat{A}} < 1, \frac{|\Delta\hat{\psi}_r^{vi}|}{|\Delta\hat{\psi}_r^{i}|} < 1,$$

and if $$\frac{A}{\hat{A}} = 1, \frac{|\Delta\hat{\psi}_r^{vi}|}{|\Delta\hat{\psi}_r^{i}|} = 1,$$

respectively. That is to say, $$\frac{A}{\hat{A}} \text{ and } \frac{|\Delta\hat{\psi}_r^{vi}|}{|\Delta\hat{\psi}_r^{i}|}$$

have the same effect on the identification result of $$\frac{\hat{T}_r}{T_r}.$$

In other words, [Eqn. 13] can also be used in the low speed region taking into account the iteration strategy.

Substituting [Eqn. 13] into [Eqn. 8], and using $\hat{T}_{r\_online}$ instead of $T_r$, yields:

$$\hat{T}_{r\_online} = \frac{1}{\omega^*}\sqrt{[1+(\omega^*\cdot\hat{T}_r)^2]\cdot\left(\frac{|\Delta\hat{\psi}_r^{i}|}{|\Delta\hat{\psi}_r^{vi}|}\right)^2 - 1}, \quad [\text{Eqn. 14}]$$

where $\omega^*$ is the frequency of the injected flux signal, $|\Delta\hat{\psi}|_r^i$ is the rotor flux variation from the current model of the voltage-current flux observer, and $|\Delta\hat{\psi}|_r^{vi}$ is the rotor flux variation from the combined voltage-current model of the voltage-current flux observer.

In the low speed region, the identification result obtained by [Eqn. 14] in only one cycle may not be the final accurate result, but a result relatively close to the true value. Therefore, several identification cycles are needed until the difference of identification results in the adjacent two cycles is sufficiently small. Accordingly, the rotor time constant may be accurately determined.

Figure 4:
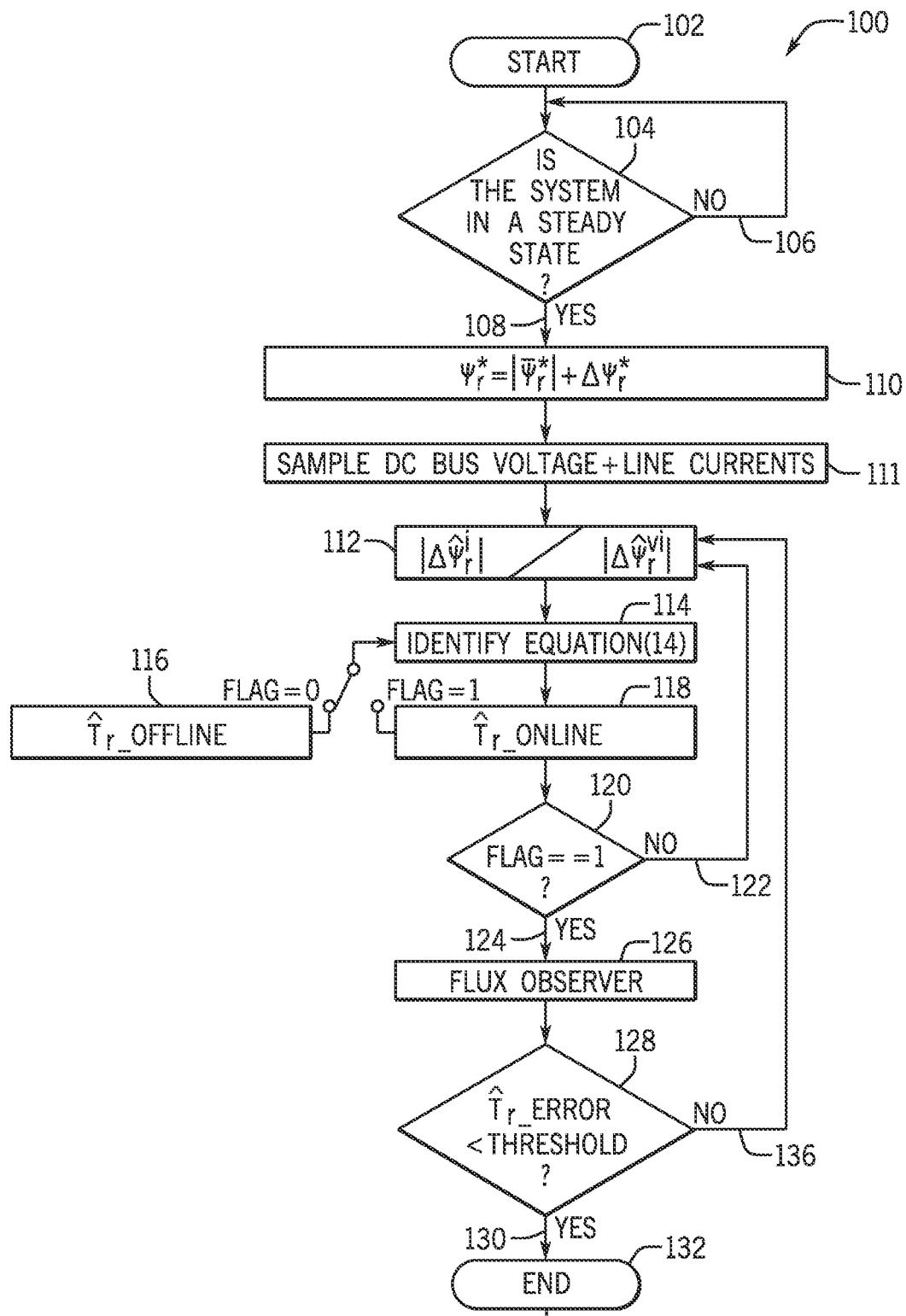
FIG. 4 is a flowchart illustrating a technique for estimating an online rotor time constant according to an embodiment of the invention.

Referring now to FIG. 4, a technique 100 for determining the rotor time constant of an AC induction machine while in operation (i.e., an online rotor time constant) is shown that implements [Eqns. 1-14] described above. The technique 100 may be performed by any of a number of digital signal processing (DSP) devices, with such devices being either integrated into a motor drive associated with the induction machine or being provided as a stand-alone algorithm unit and/or processing/computing device, and may be implemented in conjunction with speed control scheme 40 of FIG. 2 and the voltage and current flux observer 42 of FIG. 3

As shown in FIG. 4, technique 100 is started at STEP 102 and, upon starting of the technique, an initial determination is made at STEP 104 as to whether the induction machine is operating at steady state. If it is determined that the induction machine is not operating at steady, indicated at 106, then the technique 100 loops back to re-perform (at a designated time/interval) a determination at STEP 104 regarding whether the induction machine is operating at steady state. Conversely, if it is determined that the induction machine is not operating at steady, indicated at 108, then the technique 100 continues to STEP 110, where a small flux command signal $\Delta\psi_r^*$ is injected on the rotor flux command. Also at STEP 110, a value of the rotor flux command $\psi_r^*$ is determined based on an averaged flux command and on a small flux command signal injected on the flux command that is used to identify the rotor time constant (i.e., $\psi_r^* = |\overline{\psi}_r^*| + \Delta\psi_r^*$).

Upon completion of STEP 110, and during operation of the induction motor in steady-state, a DC bus voltage in inverter 24 (FIG. 2) and at least two phases of the AC line currents output from inverter 24 are measured/sampled at STEP 111. The sampled DC voltage and line currents are provided to voltage-current flux observer 42 (FIG. 2), and the technique 100 then continues at STEP 112 where, based on the sampled DC voltage and line currents, a determination of a proportion of the rotor flux variation from the current model of the voltage and current flux observer (FIG. 2) to the rotor flux variation from the combined voltage and current model of the voltage and current flux observer (i.e., $$\frac{|\Delta\hat{\psi}_r^{i}|}{|\Delta\hat{\psi}_r^{vi}|}$$

is made. When the proportion has been determined at STEP 112, variables/values are identified at STEP 114 that are to be used for determining the rotor time constant. In doing so, the status of a flag is identified that indicates whether an offline value of the rotor time constant, $\hat{T}_{r\_offline}$, is to used be used in [Eqn. 14] for determining/obtaining a first online identification value of the rotor time constant, $\hat{T}_{r\_online}$, or whether the online identification value is stable (after about several identification cycles—with the number of identification cycle being chosen to be several times as the injected frequency) and the first online identification value should be used in the actual flux observer and control. More specifically, when the Flag=0, as indicated at STEP 116, the offline identification value of rotor time constant $\hat{T}_{r\_offline}$ is used by [Eqn. 14], and the first online identification value of $\hat{T}_{r\_online}$ is obtained, as indicated at STEP 118.

As shown in FIG. 3, upon an obtaining of the first online identification value rotor time constant $\hat{T}_{r\_online}$ at STEP 118, a determination is then made at STEP 120 as to whether enough identification cycles have been performed such that the first online identification value $\hat{T}_{r\_online}$ is stable. If not enough identification cycles have been performed, as indicated at 122, then it is determined that the flag is still at the setting Flag=0, and the technique returns back to STEP 112, where the proportion of the rotor flux variation from the current model to the rotor flux variation from the combined voltage and current model is again determined and [Eqn. 14] is again utilized at STEP 114 to identify the first online rotor time constant $\hat{T}_{r\_online}$ at STEP 118.

Conversely, if it is determined at STEP 120 enough identification cycles have been performed such that the first online identification value $\hat{T}_{r\_online}$ is considered stable, as indicated at 124, then the flag is switched to the setting Flag=1 and the technique 100 continues at STEP 126, where the first online identification value of the rotor time constant $\hat{T}_{r\_online}$ is provided to/used in the actual flux observer and control.

The use of the first online identification value of the rotor time constant $\hat{T}_{r\_online}$ in the flux observer and control provides for a subsequent identification process to be performed where the new online identification value of the rotor time constant $\hat{T}_{r\_online}$ is calculated (using [Eqn. 14]) based on the online identification value calculated in the previous cycle through, such that the online identification value of the rotor time constant $\hat{T}_{r\_online}$ is updated.

Upon the determination of the online identification value of the rotor time constant $\hat{T}_{r\_online}$ in two consecutive cycles by way of the flux observer and control, a value $\hat{T}_{r\_error}$ can be obtained, which is the difference of identification results in an adjacent two cycles. That is, it is recognized that in a low speed region, the rotor time constants $\hat{T}_{r\_online}$ that are obtained may not be a final accurate estimate of the rotor time constant (although it should be relatively close to the true value)—and thus a determination needs to be made regarding whether the difference between identification results in an adjacent two cycles is sufficiently small such that the identified rotor time constant $\hat{T}_{r\_online}$ can be considered the true value. Therefore, an obtaining of the $\hat{T}_{r\_error}$ value and a comparison of $\hat{T}_{r\_error}$ to a threshold value is performed at STEP 128, with a determination being made at STEP 128 as to whether $\hat{T}_{r\_error}$ is less than the threshold. According to one embodiment, the threshold value is quantified as a determined percentage of the $\hat{T}_{r\_offline}$ value, such as 2% of the $\hat{T}_{r\_offline}$ value for example.

If it is determined at STEP 128 that a value of $\hat{T}_{r\_error}$ is less than the threshold, as indicated at 130, it is determined that the identification process is finished and the technique 100 is stopped at STEP 132. That is, if the value of $\hat{T}_{r\_error}$ is less than the threshold, then the technique 100 verifies that the estimate of rotor time constant $\hat{T}_{r\_online}$ is valid/accurate (i.e., sufficiently close to a true rotor time constant value) and, as such, the small flux signal that is injected at STEP 110 can be removed, and the drive system will work in normal state—with the identification process being repeated every certain period of time because of slow thermal drift. As shown in FIG. 4, in having validated the rotor time constant estimate, it is recognized that this estimate of the rotor time constant can be used for speed estimation and for optimizing the control and operations of the induction motor 26 by providing dynamic regulation performance and decoupling control, as shown in phantom at STEP 134.

If, however, it is determined at STEP 128 that a value of $\hat{T}_{r\_error}$ exceeds the threshold, as indicated at 136, the technique 100 continues by returning back to STEP 112, where the proportion of the rotor flux variation from the current model to the rotor flux variation from the combined voltage and current model is again determined and [Eqn. 14] is again utilized at STEPS 114-126 to identify values for the online rotor time constant $\hat{T}_{r\_online}$ using the flux observer and control.

Beneficially, by accurately identifying the rotor time constant $\hat{T}_{r\_online}$ using technique 100, the control and operations of the induction motor 12 can be optimized—as the rotor time constant is utilized for both decoupling control and speed estimation. Of further benefit, the technique 100 performs the estimation of the rotor time constant $\hat{T}_{r\_online}$ with high accuracy under both no-load or full-load conditions, with such estimations being performed using only amplitudes of the measured flux signals without considering phase drift (so as to avoid a division by zero at zero-crossing points) and by implementing an algorithm that is less computationally burdensome while still providing accurate estimation results.

A technical contribution for the disclosed method and apparatus is that it provides for a controller implemented technique that simultaneously estimates the rotor speed and rotor time constant in an AC induction machine.

Therefore, according to one embodiment of the present invention, a non-transitory computer readable storage medium has stored thereon a computer program comprising instructions which, when executed by at least one processor, cause the at least one processor to generate a rotor flux command for operation of an induction machine, cause a flux signal to be injected into the rotor flux command so as to generate a time-variant rotor flux, and determine by way of a voltage-current flux observer amplitudes of rotor flux variations resulting from the time-variant rotor flux, the amplitudes of the rotor flux variations comprising an amplitude of a rotor flux variation based on a current model of the voltage-current flux observer and an amplitude of a rotor flux variation based on a combined voltage-current model of the voltage-current flux observer. The instructions further cause the at least one processor to estimate a rotor time constant of the induction motor based on the determined amplitudes of the rotor flux variations.

According to another embodiment of the present invention, a method of determining an online rotor time constant of an AC induction machine includes injecting a flux signal having a pre-determined amplitude and frequency into a rotor flux command so as to generate a time-variant rotor flux, the rotor flux command being provided as part of a vector control scheme implemented by a variable speed drive (VSD) for operation of an induction machine. The method also includes sampling a DC voltage on a DC bus of the VSD and AC line currents on at least two phases output by the VSD, inputting the sampled DC voltage and AC line currents to a closed-loop voltage-current flux observer, determining rotor flux variation amplitudes using the voltage-current flux observer and based at least in part on the sampled DC voltage and AC line currents, and estimating an online rotor time constant of the induction motor based on the determined rotor flux variation amplitudes.

According to yet another embodiment of the present invention, a motor control system includes a variable frequency drive (VFD) coupleable to an AC induction machine to control operation thereof and at least one processor operably coupled to or integrated with the VFD, the at least one processor being programmed to generate a rotor flux command for operation of an induction machine, cause a flux signal to be injected into the rotor flux command so as to generate a time-variant rotor flux, and provide the time-variant rotor flux command as an input for a vector control of the induction machine, the sensorless vector control being implemented by a variable speed drive to control power input to the induction machine. The at least one processor is further programmed to sample a DC voltage and line currents of the VSD during operation of the induction machine, provide the sampled DC voltage and line currents to a voltage-current flux observer comprising a voltage model and a current model, and determine, by way of the voltage-current flux observer, an amplitude of a rotor flux variation based on the current model and an amplitude of a rotor flux variation based on both the voltage and current models. The at least one processor is still further programmed to estimate a rotor time constant of the induction motor based on the amplitudes of the determined rotor flux variations and estimate a rotor speed of the induction motor based on the rotor time constant, wherein the rotor time constant of the induction motor is estimated without consideration of a phase drift of the rotor flux variations, such that no division by zero at zero-crossing points is performed in estimating the rotor time constant.

The above-described methods can be embodied in the form of computer program code containing instructions embodied in one or more tangible computer readable storage media, such as floppy diskettes and other magnetic storage media, CD ROMs and other optical storage media, flash memory and other solid-state storage devices, hard drives, or any other computer-readable storage medium, wherein, when the computer program code is loaded into and executed by a computer, the computer becomes an apparatus for practicing the disclosed method.

The present invention has been described in terms of the preferred embodiment, and it is recognized that equivalents, alternatives, and modifications, aside from those expressly stated, are possible and within the scope of the appending claims.

What is claimed is:

1. A non-transitory computer readable storage medium having stored thereon a computer program comprising instructions which, when executed by at least one processor, cause the at least one processor to:
   generate a rotor flux command for operation of an induction machine;
   cause a flux signal to be injected into the rotor flux command so as to generate a time-variant rotor flux;
   determine, by way of a voltage-current flux observer, amplitudes of rotor flux variations resulting from the time-variant rotor flux, the amplitudes of the rotor flux variations comprising an amplitude of a rotor flux variation based on a current model of the voltage-current flux observer and an amplitude of a rotor flux variation based on a combined voltage-current model of the voltage-current flux observer;
   estimate a rotor time constant of the induction motor based on the determined amplitudes of the rotor flux variations; and
   control operation of the induction machine based on the estimated rotor time constant.

2. The non-transitory computer readable storage medium of claim 1 wherein the instructions further cause the at least one processor to estimate a rotor speed of the induction motor based on the rotor time constant.

3. The non-transitory computer readable storage medium of claim 2 wherein the instructions further cause the at least one processor to estimate the rotor speed simultaneously with the rotor time constant.

4. The non-transitory computer readable storage medium of claim 1 wherein the rotor time constant comprises an online rotor time constant estimated while the induction machine is in steady-state operation.

5. The non-transitory computer readable storage medium of claim 4 wherein the instructions further cause the at least one processor to estimate the online rotor time constant according to:

$$\hat{T}_{r\_online} = \frac{1}{\omega^*}\sqrt{\left[1+\left(\omega^*\cdot\hat{T}_r\right)^2\right]\cdot\left(\frac{|\Delta\hat{\psi}_r^i|}{|\Delta\hat{\psi}_r^{vi}|}\right)^2 - 1}$$

where $\omega^*$ is the frequency of the injected flux signal, $\hat{T}_r$ is one of an offline estimate of the rotor time constant or a most recently determined estimate of an online estimate of the rotor time constant, $|\Delta\hat{\psi}|_r^i$ is the rotor flux variation from the current model of the voltage-current flux observer, and $|\Delta\hat{\psi}|_r^{vi}$ is the rotor flux variation from the combined voltage-current model of the voltage-current flux observer.

6. The non-transitory computer readable storage medium of claim 4 wherein the online rotor time constant is estimated during operation of the induction machine at a full-load condition.

7. The non-transitory computer readable storage medium of claim 4 wherein the online rotor time constant is estimated during operation of the induction machine at a no-load condition.

8. The non-transitory computer readable storage medium of claim 1 wherein the instructions further cause the at least one processor to:
   estimate a plurality of online rotor time constants during operation of the induction machine;
   compare rotor time constants estimated in two consecutive cycles so as to obtain a difference value between the two rotor time constants;
   compare the difference value between the two rotor time constants estimated in two consecutive cycles to a difference threshold; and
   if the difference value between the two rotor time constants estimated in two consecutive cycles is less than the difference threshold, then verifying the rotor time constants estimated in two consecutive cycles as a valid rotor time constant estimate.

9. The non-transitory computer readable storage medium of claim 8 wherein the difference threshold comprises a value equal to 2% of an offline rotor time constant value.

10. The non-transitory computer readable storage medium of claim 1 wherein the instructions further cause the at least one processor to estimate the rotor time constant of the induction motor without consideration of a phase drift of the rotor flux variations, such that no division by zero at zero-crossing points is performed in estimating the rotor time constant.

11. The non-transitory computer readable storage medium of claim 1 wherein an amplitude of the injected flux signal is less than 5% of a value of the rotor flux command.

12. The non-transitory computer readable storage medium of claim 1 wherein, in estimating the rotor time constant based on the amplitudes of the determined rotor flux variations, the instructions further cause the at least one processor to estimate the rotor time constant of the induction motor based on a proportion of the amplitude of the rotor flux variation based on the current model to the amplitude of the rotor flux variation based on both the voltage and current models.

13. The non-transitory computer readable storage medium of claim 1 wherein the instructions further cause the at least one processor to
provide the time-variant rotor flux command as an input for a vector control of the induction machine, the sensorless vector control being implemented by a variable speed drive to control power input to the induction machine;
sample a DC voltage and line currents of the VSD during operation of the induction machine;
provide the sampled DC voltage and line currents to the voltage-current flux observer; and
determine rotor flux variation amplitudes using the voltage-current flux observer and based at least in part on the sampled DC voltage and line currents.

14. A method of controlling operation of an AC induction machine, the method comprising:
injecting a flux signal having a pre-determined amplitude and frequency into a rotor flux command so as to generate a time-variant rotor flux, the rotor flux command being provided as part of a vector control scheme implemented by a variable speed drive (VSD) for operation of an induction machine;
sampling a DC voltage on a DC bus of the VSD and AC line currents on at least two phases output by the VSD;
inputting the sampled DC voltage and AC line currents to a closed-loop voltage-current flux observer;
determining rotor flux variation amplitudes using the voltage-current flux observer and based at least in part on the sampled DC voltage and AC line currents;
estimating an online rotor time constant of the induction motor based on the determined rotor flux variation amplitudes; and
controlling operation of the AC induction machine based on the estimated online rotor time constant.

15. The method of claim 14 wherein determining the rotor flux variation amplitudes further comprises:
determining a rotor flux variation amplitude based on a current model of the voltage-current flux observer; and
determining a rotor flux variation amplitude based on a combined voltage-current model of the voltage-current flux observer; and
wherein the method further comprises determining a ratio of the current model rotor flux variation amplitude to the combined voltage-current model rotor flux variation amplitude.

16. The method of claim 14 further comprising estimating a rotor speed of the induction motor based in part on the online rotor time constant.

17. The method of claim 14 wherein the online rotor time constant is estimated while the induction machine is in steady-state operation, and is estimated according to:

$$\hat{T}_{r\_online} = \frac{1}{\omega^*}\sqrt{[1+(\omega^* \cdot \hat{T}_r)^2] \cdot \left(\frac{|\Delta\hat{\psi}_r^i|}{|\Delta\hat{\psi}_r^{vi}|}\right)^2 - 1}$$

where $\omega^*$ is the frequency of the injected flux signal, $\hat{T}_r$ one of an offline rotor time constant estimate or a most recently determined estimate of an online rotor time constant estimate, $|\Delta\hat{\psi}|_r^i$ is the rotor flux variation from the current model of the voltage-current flux observer, and $|\Delta\hat{\psi}|_r^{vi}$ is the rotor flux variation from the combined voltage-current model of the voltage-current flux observer.

18. The method of claim 14 further comprising:
estimating a plurality of online rotor time constants during operation of the induction machine;
comparing online rotor time constants estimated in two consecutive cycles so as to obtain a difference value between the two online rotor time constants;
comparing the difference value between the two online rotor time constants estimated in two consecutive cycles to a difference threshold; and
if the difference value between the two online rotor time constants estimated in two consecutive cycles is less than the difference threshold, then verifying the online rotor time constants estimated in two consecutive cycles as a valid online rotor time constant estimate.

19. The method of claim 14 further comprising:
identifying when the induction machine is operating in steady-state; and
upon identification of the induction machine operating in steady-state, injecting the flux signal into the rotor flux command.

20. A motor control system comprising:
a variable frequency drive (VFD) coupleable to an AC induction machine to control operation thereof; and
at least one processor operably coupled to or integrated with the VFD, the at least one processor being programmed to:
generate a rotor flux command for operation of an induction machine;
cause a flux signal to be injected into the rotor flux command so as to generate a time-variant rotor flux;
provide the time-variant rotor flux command as an input for a vector control of the induction machine, the sensorless vector control being implemented by a variable speed drive to control power input to the induction machine;
sample a DC voltage and line currents of the VSD during operation of the induction machine;
provide the sampled DC voltage and line currents to a voltage-current flux observer, the voltage-current flux observer comprising a voltage model and a current model;
determine, by way of the voltage-current flux observer, an amplitude of a rotor flux variation based on the current model and an amplitude of a rotor flux variation based on both the voltage and current models;
estimate a rotor time constant of the induction motor based on the amplitudes of the determined rotor flux variations, with the estimation of the rotor time constant being performed without consideration of a phase drift of the rotor flux variations, such that no division by zero at zero-crossing points is performed in estimating the rotor time constant;

estimate a rotor speed of the induction motor based on the rotor time constant;

control operation of the AC induction machine based on the estimated rotor time constant and estimated rotor speed, including providing dynamic regulation and decoupling control of the AC induction machine.

\* \* \* \* \*

UNITED STATES PATENT AND TRADEMARK OFFICE
CERTIFICATE OF CORRECTION

PATENT NO. : 9,525,377 B2
APPLICATION NO. : 14/703554
DATED : December 20, 2016
INVENTOR(S) : Wang et al.

Page 1 of 1

It is certified that error appears in the above-identified patent and that said Letters Patent is hereby corrected as shown below:

In the Claims

Column 16, Line 7 (Claim 17), delete "$\hat{T}_r$ one" and substitute therefore -- $\hat{T}_r$ is one --.

Signed and Sealed this
Twenty-eighth Day of February, 2017

Michelle K. Lee
*Director of the United States Patent and Trademark Office*